US006224420B1

(12) United States Patent
Nishio et al.

(10) Patent No.: US 6,224,420 B1
(45) Date of Patent: May 1, 2001

(54) ELECTRICAL CONNECTOR

(75) Inventors: Atsushi Nishio, Ibaraki; Katsuhiro Hori, Mito, both of (JP)

(73) Assignee: Mitsomi Newtech Co., Ltd. (JP)

( * ) Notice: Subject to any disclaimer, the term of this patent is extended or adjusted under 35 U.S.C. 154(b) by 0 days.

(21) Appl. No.: 09/491,375

(22) Filed: Jan. 26, 2000

(30) Foreign Application Priority Data

Jan. 27, 1999 (JP) ........................................ 11-018582

(51) Int. Cl.$^7$ .............................. H01R 13/73; H02B 1/01
(52) U.S. Cl. ........................................ 439/566; 439/607
(58) Field of Search .................................. 439/566, 607

(56) References Cited

U.S. PATENT DOCUMENTS 5,267,868 * 12/1993 Wolff, Jr. ............................ 439/607
5,928,035 * 7/1999 Jankowsky et al. ................ 439/607
6,000,968 * 12/1999 Hagiwara ............................ 439/607
6,007,376 * 12/1999 Shimizu .............................. 439/571
6,007,381 * 12/1999 Ando et al. .......................... 439/607
6,036,544 * 3/2000 Brunker et al. ...................... 439/607

FOREIGN PATENT DOCUMENTS

91071 * 8/1992 (JP) .

* cited by examiner

*Primary Examiner*—Tulsidas Patel
*Assistant Examiner*—Hae Moon Hyeon
(74) *Attorney, Agent, or Firm*—Morrison Law Firm

(57) ABSTRACT

Fixing L-shaped wings, extending downward along a front side of an electrical socket, are soldered to a substrate. Fixing legs, extending downward along a back side of the socket, are also soldered to the substrate. Bridge projections extend downward from the bottom of the socket toward the substrate to brace the socket during insertion and removal. Slots along the side of the socket match projections along the sides of the plug and guide the plug as it is inserted into the socket.

13 Claims, 4 Drawing Sheets

ELECTRICAL CONNECTOR

BACKGROUND OF THE INVENTION

The present invention relates to an electrical connector. More specifically, the present invention relates to an electrical connector used for connecting electronic devices such as personal computers.

Recently, personal computers have begun to use miniature electrical connectors referred to as USB (Universal Serial Bus) connectors, as shown in FIG. 5.

This type of miniature electrical connector, typically includes: a connector socket 2A mounted on a printed circuit substrate 1A. A connector plug 3A, is insertable within connector socket 2A. Connector socket 2A includes a shield case 4A, which is formed by bending a metal sheet in the shape of a rectangular column.

Within shield case 4A, an insulative housing 6A supports four contact pins 5A. Contact pins 5A are laterally arranged side-by-side. An intermediate section of contact pins 5A is fixed to an insulative housing base 6*a*. This arrangement connects external connecting ends 5*a* to contact pins 5A. An end support 6B is integrally molded with the upper half of insulative housing base 6*a*. End support 6B is formed so that its vertical thickness is roughly half that of shield case 4A. A bottom surface of end support 6B supports a contact end 5*b* of contact pins 5A.

Connector plug 3A connects to connector socket 2A. A shield case 7A, which is formed as a rectangular column, can be inserted inside shield case 4A. A space 8A is formed within a plug shield 7*a* of shield case 7A and receives end support 6B. A contactor 10A has a contact end 10*a* positioned directly below space 8A. Contact end 10*a* is supported by an end support 9*a* of an insulative housing 9A.

In this conventional connector socket 2A, a pair of fixing claws 11 is integrally molded from ear-ward portions of the side walls of shield case 4A. This allows connector socket 2A to be mounted to printed circuit substrate 1A. The ends of fixing claws 11 are inserted through holes formed on printed circuit substrate 1A. Fixing claws 11 are then soldered to the conductor layer of printed circuit substrate 1A using a solder-dipping method.

However, when connector socket 2A is fixed via fixing claws 11, in the above manner, the connection between fixing claws 11 and printed circuit substrate 1A is weak. Thus, shield case 4A may be deformed if connector socket 2A is "forced" while inserting connector plug 3A. Shield case 4A must be rigid enough to prevent connector 2A from twisting, even if connector plug 3A is forced into position. This requirement is an obstacle to the miniaturization of connector socket 2A.

OBJECTS AND SUMMARY OF THE INVENTION

An object of the present invention is to overcome the problems of the conventional miniature connector described above.

Another object of the present invention is to provide an electrical connector that does not easily deform during insertion or removal.

Yet another object of the present invention is to provide accurate and good contacts between the external contact terminals and the conductor layer of the circuit substrate.

Briefly stated, the present invention provides fixing L-shaped wings, extending downward along a front side of an electrical socket, are soldered to a substrate. Fixing legs, extending downward along a back side of the socket, are also soldered to the substrate. Bridge projections extend downward from the bottom of the socket toward the substrate to brace the socket during insertion and removal. Slots along the side of the socket match projections along the sides of the plug and guide the plug as it is inserted into the socket.

According to an embodiment of the invention, there is provided an electrical connector comprising: a socket; the socket having a downwardly extending left and right fixing wing disposed along a front portion of a left and right side surface respectively of the socket; the fixing wings are L-shaped having a foot part; the foot part extending downward toward a circuit board; and the socket also having a downwardly extending left and right fixing leg disposed along a rear portion of a left and right side surface respectively of the socket affixable to the circuit board.

According to another embodiment of the invention, there is provided an electrical connector assembly comprising: a socket; the socket having a downwardly extending left and right fixing wing disposed along a front portion of a left and right side surface respectively of the socket; the fixing wings are L-shaped having a foot part; the foot part extending downward toward a circuit board; the socket also having a downwardly extending left and right fixing leg disposed along a rear portion of a left and right side surface respectively of the socket affixable to the circuit board.; a plug; and the plug removably fitting within the socket.

The present invention provides an electrical connector mounted on a printed circuit substrate. An insulative housing supports a plurality of contact members. The insulative housing is mounted in a shield case. The shield case is formed by bending a metal sheet into a rectangular cylinder. A pair of fixing wings is formed by cutting and bending lower portions of side walls toward the front of the shield case in an "L" shape. A pair of fixing legs is formed by cutting and bending the rear end of the shield case. The fixing wings and the fixing legs are soldered to a conductor layer on the printed circuit substrate.

In the preferred embodiment of the present invention, the fixing wings and the fixing legs end at a position lower than the bottom surface of the shield case. Additionally, the fixing legs are positioned close to the external contact ends of the contact members which are soldered to the conductor layer of the printed circuit substrate. This arrangement accurately maintains the positioning between the external contact ends. Also provided are a pair of longitudinally extending slots formed from a rear end surface of the side walls of the shield case. The insulative housing has ridge projections integrally formed on its opposing side surfaces. The ridge projections fit within the shield case slots and guide the housing as it slides into the shield case. The insulative housing and the shield case form a portion of the connector socket.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

Figure 1:
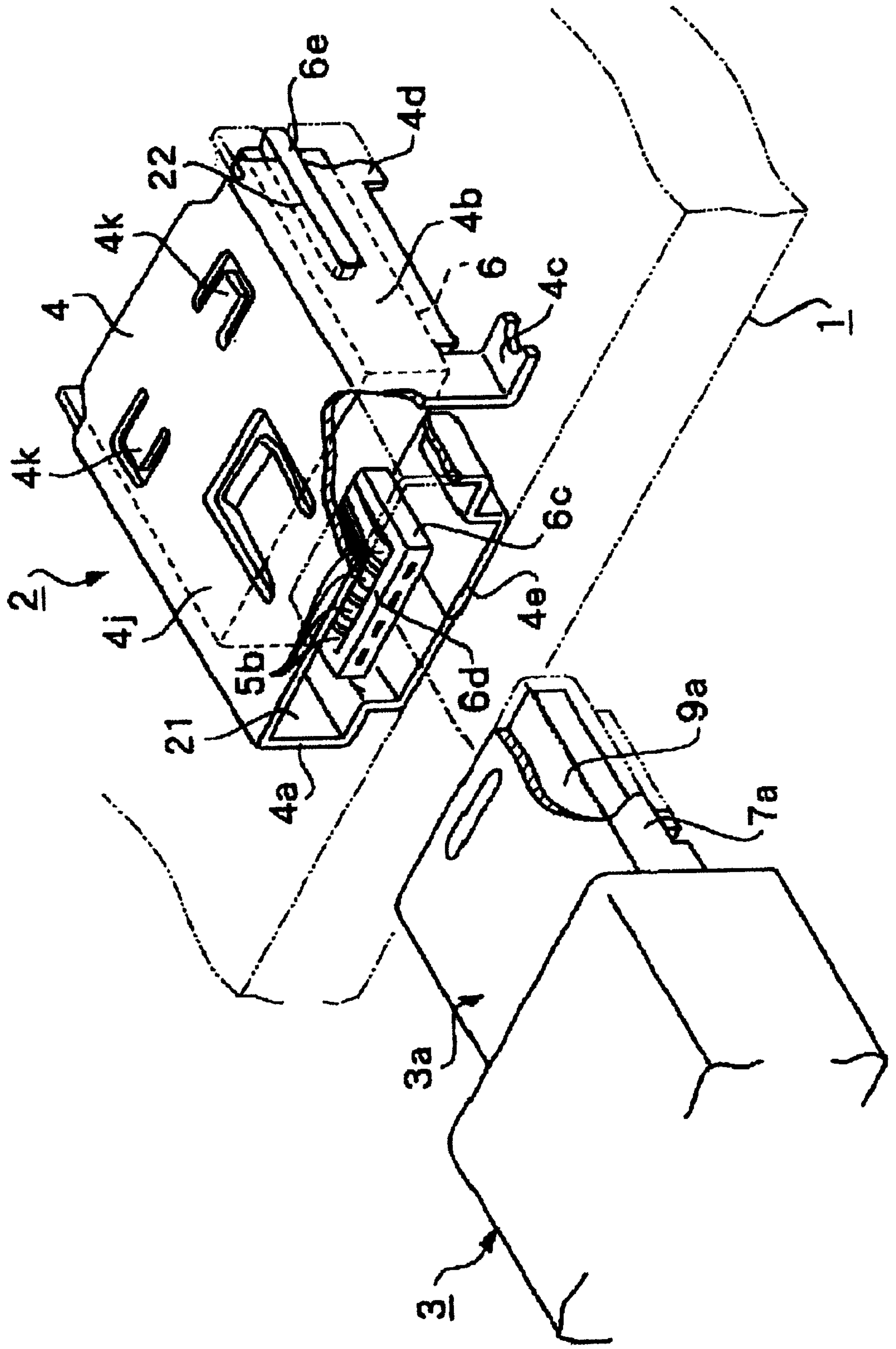
FIG. 1 is an exploded perspective drawing of an electrical connector according to the present invention with a section cut away.
Figure 2:
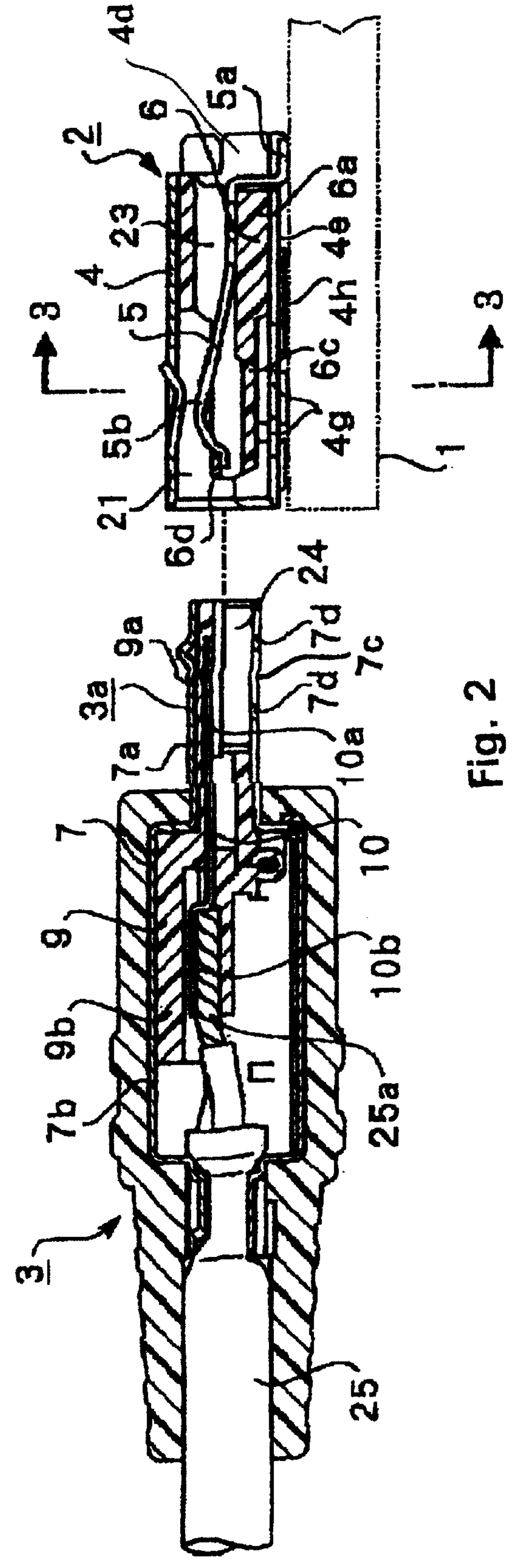
FIG. 2 is a cross-section drawing of the same miniature connector.

Referring to FIGS. 1 and 2, an electrical connector includes a connector socket 2 mounted on the surface of a printed circuit substrate 1. A connector plug 3 has a plug 3a. Plug 3a fits into an insertion opening 21 disposed within connector socket 2.

Connector socket 2 includes a shield case 4 formed by bending a sheet of metal into a rectangular column which defines insertion opening 21.

Figure 3:
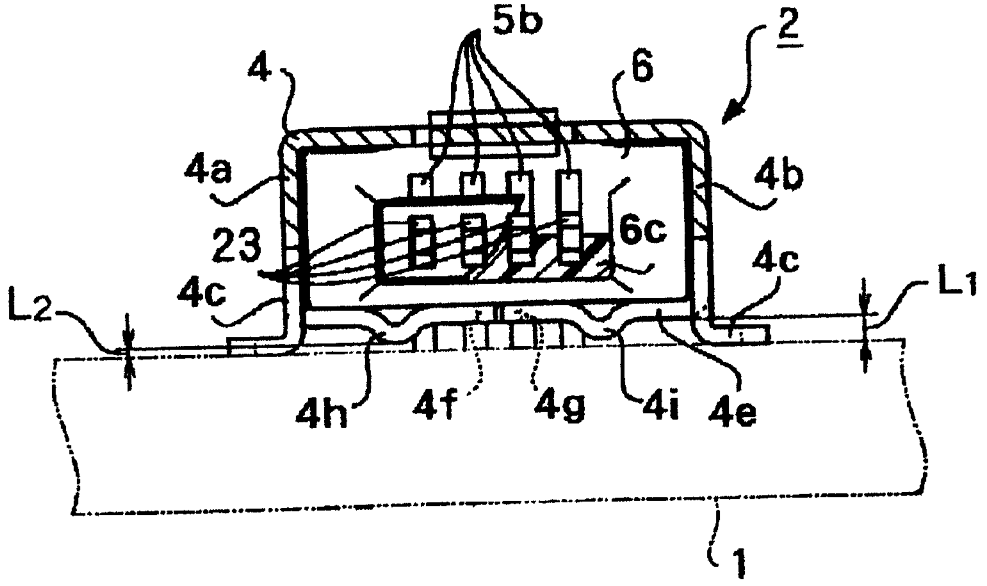
FIG. 3 is a detail cross-section drawing of the same miniature connector along the 3—3 line in FIG. 2.

Referring now to FIGS. 1 and 3, a pair of fixing wings 4c are formed at the bottom edges of a left side wall 4a and right side wall 4b of shield case 4 respectively. Each Fixing wing 4c is bent to form an L-shaped structure with the foot of L-shaped fixing wing 4c facing printed circuit substrate 1. A pair of fixing legs 4d are formed by cutting rear sections of shield case 4 so that a left and right leg section projects downward towards printed circuit substrate 1.

Referring to FIG. 3, the bottom surface of shield case 4 is separated from the surface of printed circuit substrate 1 by a distance L1. Fixing wings 4c and fixing legs 4d extend past a bottom surface 4e of shield case 4 and rest on the surface of printed circuit substrate 1 ensuring that distance L1 is maintained. In this way, when connector socket 2 is mounted on printed circuit substrate 1, bottom surface 4e is prevented from making contact with printed circuit substrate 1. Only the bottom surfaces of fixing wings 4c and fixing legs 4d are in contact with the conductor layer of printed circuit substrate 1. Fixing wings 4c and fixing legs 4d are fixed to printed circuit substrate 1 using solder dipping. This ensures that connector socket 2 is firmly attached to printed circuit substrate 1.

Fixing legs 4d maintain the precise positioning, relative to a bottom surface of external connection ends 5a, of contact pins 5, described in detail later. Fixing legs 4d are able to maintain the precise distance L1 described since the bottom surface of fixing legs 4d is a surface cut during the molding process.

Figure 4:
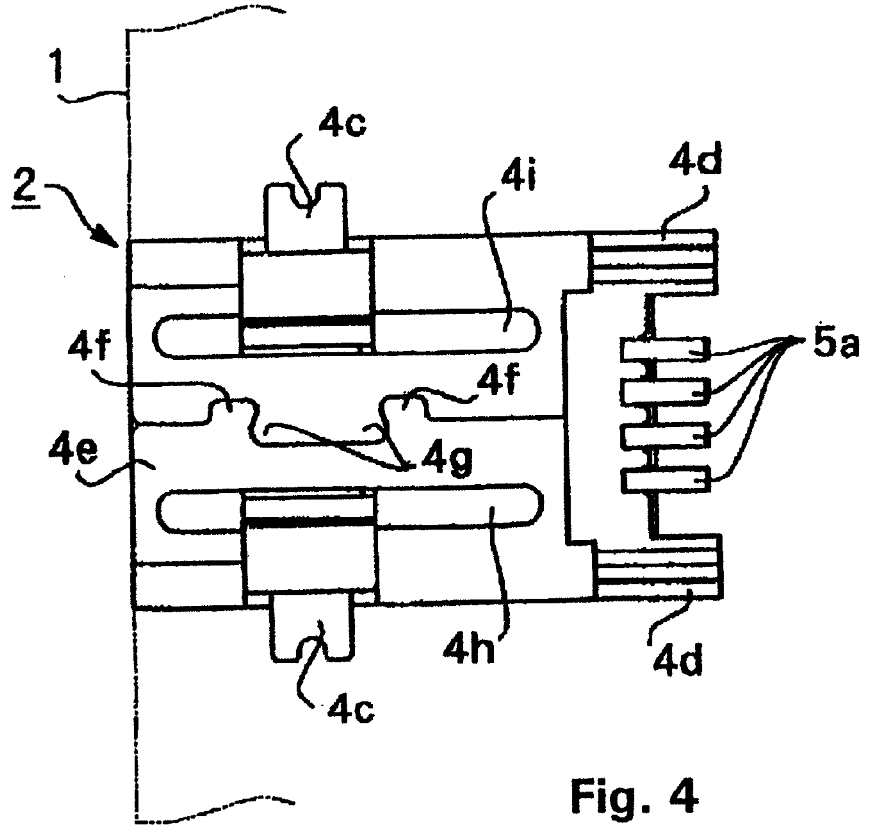
FIG. 4 is a detail bottom-view drawing of the connector socket of the same miniature connector.
Figure 5:
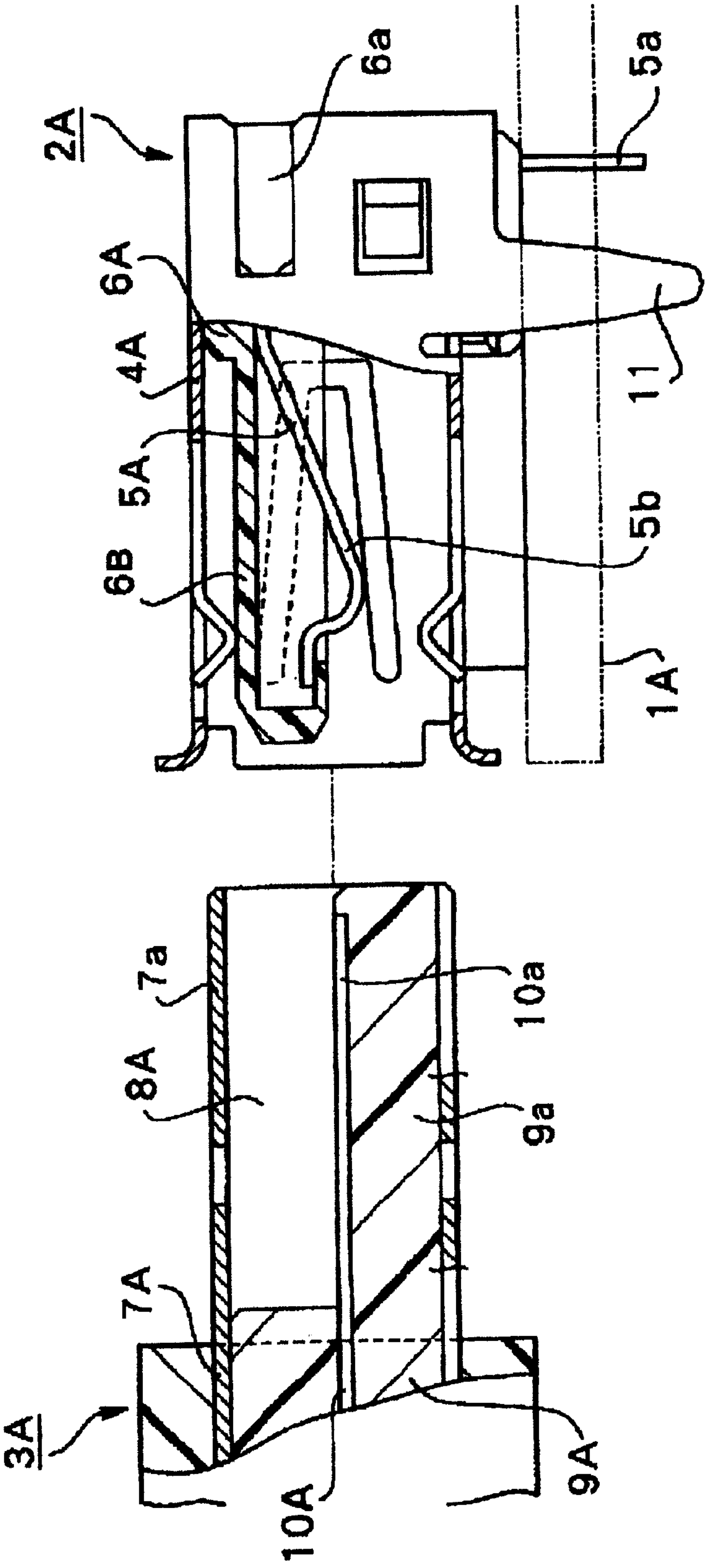
PRIOR ART Fig. 5
FIG. 5 is a detail side-view drawing of a conventional USB connector with a section cut away.

Referring to FIG. 4, bottom surface 4e of shield case 4 is bent perpendicularly to left side wall 4a and right side wall 4b. Two mutually engaging claw-shaped projections 4f and 4g are formed along the ends of left and right side walls 4a and 4b respectively.

Two bridge projections, 4h and 4i, are formed along bottom surface 4e. Bridge projections 4h and 4i project downward toward printed circuit substrate 1. Bridge projections 4h and 4i prevent bottom surface 4e from opening even when stressed due to improper insertion or removal of connector plug 3. As shown in FIG. 4, fixing legs 4d extend in parallel with external connection ends 5a away from shield case 4. Fixing legs 4d extend to protect external ends 5a and enable precision positioning on the surface of substrate 1.

Referring again to FIGS. 1 and 3, the bottom surfaces of bridge projections 4h and 4i are offset from the bottom surfaces of fixing wings 4c and fixing legs 4d by a small distance L2. In this way, even if shield case 4 is forced downward by improper forces during insertion or removal of connector plug 3, bottom surface 4e remains closed as long as the solder holds. Improper forces tend to force bottom surface 4e to bend and open towards printed circuit substrate 1. When this starts to happen, bridge projections 4h and 4i immediately come into contact with the surface of printed circuit substrate 1. Further movement becomes impossible as long as the solder holding fixing wings 4c and fixing legs 4d remains intact. This prevents bottom surface 4e from being deformed.

An insulative housing 6, molded from resin, is positioned inside shield case 4. Insulative housing 6 supports four contact pins 5. Contact pins 5 are arranged in a row along the lateral axis of shield case 4.

Insulative housing 6 fits within shield case 4. In order to facilitate and ensure precise positioning of insulative housing 6, shield case 4 has two slots 22. Slots 22 are formed along a rear portion left wall 4a and right wall 4b. Ridge projections 6e are integrally formed in insulative housing 6. Projections 6e fit within slots 22. This arrangement guides insulative housing 6 as it is inserted within shield case 4. Because of the interlocking nature of slots 22 and projections 6e, insulative housing 6 is aligned and stabilized when inserted into shield case 4.

Insulative housing 6 is inserted into shield case 4 from the rear. Ridge projections 6e of insulative housing 6 fit into slots 22. This arrangement vertically stabilizes insulative housing 6 relative to shield case 4. Also, housing 6 is prevented from moving forward relative to shield case 4, thereby securing the forward positioning of insulative housing 6.

Insulative housing 6 includes a base 6a. Base 6a has a cross-sectional dimension that is roughly the same as the cross-sectional dimension of the inside of shield case 4. Two cavities (not shown) are formed on an upper surface of base 6a. Two fixing claws 4k are formed by cutting and bending an upper wall 4j of shield case 4. Fixing claws 4k fit into the two cavities (not shown.) Thus, when insulative housing 6 is inserted into shield case 4 during assembly, fixing claws 4k are inserted into the corresponding cavities. This positions insulative housing 6 relative to shield case 4 and fixes same.

An end support 6c is formed integrally with base 6a as a cantilevered projection within shield case 4. Four attachment grooves 23 are formed along the length of end support 6c and base 6a. Attachment grooves 23 are arranged parallel to each other along the lateral axis of shield case 4. Elastic metal contact pins 5 are positioned in each attachment groove 23. An intermediate section of contact pins 5 is fixed within corresponding attachment grooves 23. External connection ends 5a, formed as L-shaped bends in contact pins 5, extend out from the rear of shield case 4. External connection ends 5a are soldered to the conductor layer of printed circuit substrate 1.

Contact ends 5b are formed as arcuate bends in contact pins 5. Contact ends 5b are exposed upwardly from within attachment grooves 23 to an upper surface of end support 6c. Contact ends 5b are held by engagement pieces 6d. Engagement pieces 6d are formed integrally with an end of end support 6c. Engagement pieces 6d prevent external connection ends 5a from freely projecting outside corresponding attachment grooves 23.

Referring to FIGS. 2 and 3, connector plug 3 is covered with an outer insulative resin covering. Plug 3a and a shield case 7 are also covered with an insulative resin. Plug 3a includes a plug shield 7a. Plug shield 7a has an outer dimension that corresponds to the inner dimension of shield case 4. Plug 3a fits within insertion opening 21. As with shield case 4 described above, plug shield 7a is formed by bending a sheet of metal into a rectangular column. An end support 9*a* of an insulative housing 9 is positioned inside plug shield 7*a*. End support 9*a* supports four contactors 10. Contactors 10 and contact pins 5 are aligned with each other.

Referring to FIG. 2, contact ends 10*a* of contactors 10 are exposed at a bottom surface of end support 9*a*. Contact ends 10*a* extend along an upper wall of plug shield 7*a*. A space 24 is bounded by end support 9*a* and plug shield 7*a*. Space 24 receives end support 6*c* of insulative housing 6 described above. Thus, when plug 3*a* of connector plug 3 is fitted into insertion opening 21, end support 6*c* and end support 9*a* are brought close to each other. End support 6*c* is positioned just below end support 9*a* so that they face each other. As a result, contact ends 10*a* of contactors 10 come into contact with corresponding contact ends 5*b* of contact pins 5.

Shield case 7, described above, includes a cord shield 7*b*. Cord shield 7*b* is formed integrally with plug shield 7*a*. Cord shield 7*b* is formed to enclose a comparatively large volume. A cord connector 9*b*, which is connected to end support 9*a,* is positioned inside cord shield 7*b*. Cord connection ends 10*b* of contactors 10 are positioned within cord connector 9*b*. Cord connection ends 10*b* are fixed via solder to wires 25*a* in a connection cord 25. Connection cord 25 feeds in from an end of cord shield 7*b*.

Referring to FIGS. 1 and 2, assembled connector socket 2 is mounted on the surface of printed circuit substrate 1. Shield case 4 is formed using a sheet metal blank. The sheet metal blank is bent at right angles. However, due to the spring-back effect of metal inherent in the bending process, a bottom surface 4*e* of shield case 4 will tend to open outward when the two ends are abutted against each other.

This is why the abutting surfaces of bottom surface 4*e* of shield case 4 are formed with mutually engaging claw projections 4*f* and 4*g*. Claw projections 4*f* and 4*g* engage each other and reliably prevent bottom surface 4*e* from opening.

As insulative housing 6, to which contact pins 5 are attached, is inserted into shield case 4, it is guided and supported by ridge projections 6*e*. Insulative housing 6 is firmly fixed to shield case 4 due to the interaction of slots 22 with ridge projections 6*e*. Fixing claws 4*k* engage insulative housing 6 and prevent insulative housing 6 from disengaging from shield case 4.

Connector socket 2 is soldered to printed circuit substrate 1 using solder dipping. Fixing wings 4*c* and fixing legs 4*d* of shield case 4 are soldered to the conductor layer of printed circuit substrate 1. Thus, even if a large external force is applied to connector socket 2 during insertion or removal of connector plug 3, connector socket 2 remains firmly fixed to printed circuit substrate 1. Fixing legs 4*d* firmly hold external connection ends 5*a* of contact pins 5 against the conductor layer of printed circuit substrate 1.

If shield case 4 is “forced” by an external force during insertion or removal of connector plug 3, bottom surface 4*e* of shield case 4 will tend to open. If this happens, the bottom surfaces of projections 4*h* and 4*i* will come into contact with the surface of printed circuit substrate 1. Once this happens, any further opening is prevented. This prevents bottom surface 4*e* from being forced open and coming into contact with the conductor layer of printed circuit substrate 1.

Bottom surface 7*c* is formed with claw projections 7*d* analogous with claw projections 4*f* and 4*g* (FIG. 4) described above. This prevents the abutting left and right bottom surface 7*c* from opening.

Shield case 4 is firmly fixed to printed circuit substrate 1 via solder at four points using fixing wings 4*c* and fixing legs 4*d*. Because of this, shield case 4 remains rigid even if shield case 4 is structurally flexible. This is true even when improper force is applied to shield case 4 during insertion or removal of plug 3. This allows connector socket 2 and plug 3 to be miniaturized.

The above, and other objects, features and advantages of the present invention will become apparent from the following description read in conjunction with the accompanying drawings, in which like reference numerals designate the same elements.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. An electrical connector socket comprising:

a socket;

said socket having a downwardly extending left and fight fixing wing disposed along a front portion of a left and right side surface respectively of said socket;

said fixing wings are L-shaped having a foot part;

said foot part extending downward toward a circuit board;

said socket also having a downwardly extending left and right fixing leg disposed along a rear portion of a left and right side surface respectively of said socket affixable to said circuit board;

said fixing wings and said fixing legs projecting beyond a bottom surface of said socket whereby said socket is accurately positioned relative to an external connection element and said circuit board; and said fixing legs projecting away from said socket substantially parallel with said external connection element, whereby said fixing legs provide extending protection for said external connection element.

2. An electrical connector according to claim 1 wherein said fixing wings and said fixing legs project beyond a bottom surface of said socket.

3. An electrical connector according to claim 1, further comprising:

an insulative housing; and said insulative housing being disposed within said socket.

4. An electrical connector according to claim 3, further comprising a plurality of contact members disposed within said insulative housing.

5. An electrical connector according to claim 4, further comprising:

a left and right longitudinally extending slot disposed along a rearward left and right side surface respectively of said socket;

said left and right longitudinally extending slots being alignable with matching projections disposed along a left and right side of said insulative housing.

6. An electrical connector according to claim 1 wherein said fixing wings and fixing legs are soldered to said circuit board.

7. An electrical connector comprising:

a socket;

said socket having a downwardly extending left and right fixing wing disposed along a front portion of a left and right side surface respectively of said socket;

said fixing wings are L-shaped having a foot part;

said foot part extending downward toward a circuit board;

said socket also having a downwardly extending left and right fixing leg disposed along a rear portion of a left and right side surface respectively of said socket affixable to said circuit board; and at least one downwardly extending bridge projection disposed along a bottom surface of said socket.

8. An electrical connector according to claim 2, further comprising:

at least two mutually engaging claw projections on said socket; and said at least two claw projections being of a type substantially preventing separation of said bottom surface.

9. An electrical connector assembly comprising:

a socket;

said socket having a downwardly extending left and right fixing wing disposed along a front portion of a left and right side surface respectively of said socket;

said fixing wings are L-shaped having a foot part;

said foot part extending downward toward a circuit board;

said socket also having a downwardly extending left and right fixing leg disposed along a rear portion of a left and right side surface respectively of said socket affixable to said circuit board;

a plug;

said plug removably fitted within said socket;

said fixing wings and said fixing legs projecting beyond a bottom surface of said socket whereby said socket is accurately positioned relative to an external connection element and said circuit board; and said fixing legs projecting away from said socket substantially parallel with said external connection element, whereby said fixing legs provide extending protection for said external connection element.

10. An electrical connector assembly according to claim 9, further comprising:

an insulative housing; and said insulative housing being disposed within said socket.

11. An electrical connector assembly according to claim 8, further comprising:

a left and right longitudinally extending slot disposed along a rearward left and right side surface respectively of said socket;

a left and right longitudinally extending projection disposed along a left and right side respectively of said insulative housing;

said plug removably fitting within said socket;

said left and right longitudinally extending projections guidable along said left and right longitudinally extending slots.

12. An electrical connector assembly comprising:

a socket;

said socket having a downwardly extending left and right fixing wing disposed along a front portion of a left and right side surface respectively of said socket;

said fixing wings are L-shaped having a foot part;

said foot part extending downward toward a circuit board;

said socket also having a downwardly extending left and right fixing leg disposed along a rear portion of a left and right side surface respectively of said socket affixable to said circuit board;

a plug;

said plug removably fitting within said socket; and at least one downwardly extending bridge projection disposed along a bottom surface of said socket.

13. An electrical connector assembly according to claim 12, further comprising:

at least two mutually engaging claw projections on said socket; and said at least two claw projections being of a type substantially preventing separation of said bottom surface.

* * * * *